United States Patent [19]

Rudland

[11] Patent Number: 4,538,059
[45] Date of Patent: Aug. 27, 1985

[54] IDENTIFICATION CARD WITH CONCEALED CODING AND A SIMPLE READER MODULE TO DECODE IT

[75] Inventor: Peter E. Rudland, Broadstone, England

[73] Assignee: ITR International Time Limited, Swindon, England

[21] Appl. No.: 417,624

[22] Filed: Sep. 13, 1982

[30] Foreign Application Priority Data

Sep. 16, 1981 [GB] United Kingdom ............... 8127962

[51] Int. Cl.³ .............................................. G06K 7/10
[52] U.S. Cl. .................................... 235/468; 235/466; 235/462; 235/487; 235/494
[58] Field of Search ............... 235/468, 462, 468, 487, 235/488, 494; 369/121

[56] References Cited

U.S. PATENT DOCUMENTS

| | | | |
|---|---|---|---|
| 3,534,166 | 10/1970 | Korpel | 369/121 |
| 3,752,963 | 8/1973 | Herrin | 235/494 |
| 3,783,245 | 1/1974 | Howell | 235/494 |
| 3,949,233 | 4/1976 | Gluck | 235/462 |
| 4,044,231 | 8/1977 | Beck | 235/488 |
| 4,096,992 | 6/1978 | Notiri | 235/462 |
| 4,237,376 | 12/1980 | Giacomotti | 235/487 |
| 4,359,633 | 11/1982 | Bianco | 235/468 |

Primary Examiner—Harold I. Pitts
Attorney, Agent, or Firm—Shoemaker and Mattare, Ltd.

[57] ABSTRACT

An instruction or identification card or badge for use in a time recording system, to authorize admission to restricted locations or for use in credit transactions comprises layers of material that is opaque to visible light but transparent to infra-red radiation. A code that is readable by an optoelectronic reader but is invisible in ordinary light is provided by transparent windows alternating with infra-red opaque regions arranged along a line parallel to one edge of the card, one binary digit being represented by wide rectangular windows and the other binary digit being represented by narrower windows that when read in a badge reader give different peak heights. The code is self-clocking and need occupy only a small portion of the card area.

16 Claims, 10 Drawing Figures

IDENTIFICATION CARD WITH CONCEALED CODING AND A SIMPLE READER MODULE TO DECODE IT

FIELD OF THE INVENTION

This invention relates to an instruction or identification card or badge and its use in a time recording system.

BACKGROUND TO THE INVENTION

There are many applications in which it is necessary to confirm the identity of an individual. Such applications include the purchase of merchandise using a credit card, cashing cheques at banks or validation of cheques when used in payment for merchandise or services, admission to locations where only authorised personnel must be allowed access, and the identification of users of a time-recording system for use in monitoring the arrival and departure of employees at a place of work.

In some of these applications it is necessary to ensure that the holder of such a card or any third party into whose hands it may pass as a result of theft or casual loss, is unable to change the code embodied in or on the card, and thereby gain unauthorised access or obtain merchandise dishonestly.

A number of methods have been described for ensuring that the codes cannot be altered without mutilating a card so drastically that it is no longer capable of being used. Among these methods are several in which the coding is concealed within the structure of the card, invisible to the naked eye but detectable by a variety of techniques depending on magnetic interaction, radio frequency coupling, radioactive detection, reflection or attenuation of infra-red radiation of other physical phenomena.

A number of techniques have been described in which infra-red radiation is applied to one side of a composite card and a series of infra-red detectors located on the other side respond to the presence or absence of a transmission path through the card at specified locations. Some such methods have been disclosed by Scuitto and Kramer in U.S. Pat. No. 3,875,375, by Lawrence Systems Inc., in U.S. Pat. No. 4,066,910, by Interflex Datensystem of Germany, in UK Pat. No. 2009477, by EMI Ltd, in UK Pat. No. 1581624 and by J. R. Scantlin of Transaction Technology Inc. in U.S. Pat. Nos. 3,858,032, 3,819,910 and 3,802,101.

Most of the above mentioned patents disclose techniques in which several parallel tracks of data are scanned by a set of several photodetectors, one such track being used as a clock track while the corresponding data bits in the other tracks are either translucent to represent a binary digit ONE or opaque to represent a binary digit ZERO or vice versa. The mechanisms used to transport the cards past the read heads and for effecting the parallel signal paths from the several tracks to the associated digital electronic systems have various levels of complexity according to the details of the intended application.

SUMMARY OF THE INVENTION

It is an object of the present invention to provide a simpler method of coding a card, in which all data is located serially along a single track, which includes distinct symbols for both ONEs and ZEROs and since neither of them is represented by an opaque area, positive clocking is inherent in the single track without any constraint on the rate of scanning.

Broadly stated, the invention provides an instruction or identification card or badge for use with a time recording system or to authorise admission to restricted locations or for use in credit transactions, wherein the card is provided with a concealed code, which, while being invisible to the naked eye when viewed in visible light, is readable by an optoelectronic reader using infra-red radiation; the code being characterised by successive digits represented by transparent windows alternating with regions opaque to infra-red radiation the said windows and opaque regions being arranged along a line parallel to one edge of the card, one binary digit being represented by wide rectangular windows while the other binary digit is represented by significantly narrower windows.

For non-binary codes, windows of more than two discrete widths may similarly be used.

Other features of the invention will be apparent from the appended claims to which attention is hereby directed.

BRIEF DESCRIPTION OF THE DRAWINGS

The invention will now be described by way of example only with reference to the accompanying drawings, in which.

Figure 1:
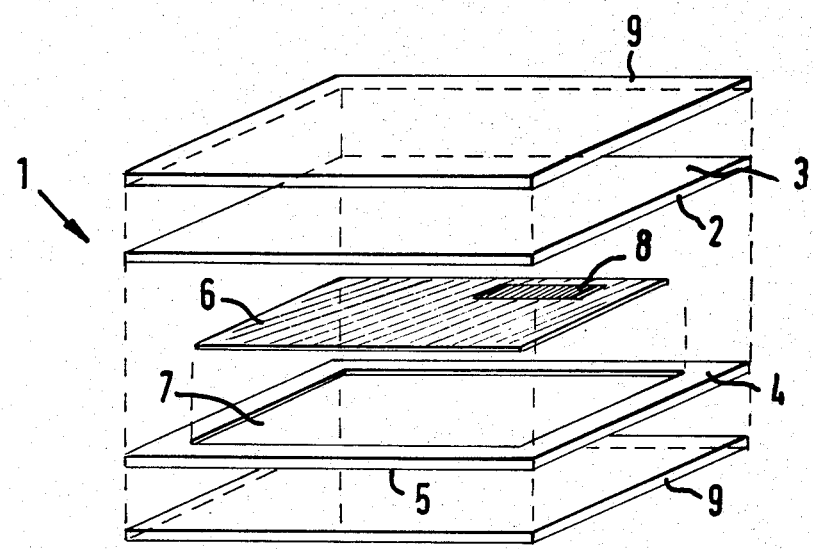
FIG. 1 is an exploded view of the several layers of which the plastics card is constructed.

A sheet of photographic film 6 may be exposed over most of its area to produce a layer of silver opaque to infra-red radiation, except in those areas which have been covered during exposure. The exposed and developed film has areas 10, 12 forming a series of transparent windows spaced more or less equally along a line to form a code zone 8 resembling a conventional bar-code of the type used in reflected light.

This code zone 8 may be located in any part of the sheet, with its long dimension parallel to the long dimension of the sheet 6, but in a preferred embodiment it is located near one corner of the sheet 6 for reasons which will become apparent below. In another embodiment, the sheet 6 may have smaller dimensions than shown in FIG. 1, being in fact only marginally larger in dimensions than the code zone 8.

Two thicker sheets 2, 4 of opaque thermoplastic material, typically 0.2 mm thick black polyvinylchloride are cut or moulded to a generally rectangular shape with or without rounded corners, and of dimensions larger than those of the coded sheet 6 to form the visible body of the assembled card. The outer faces 3, 5 of these sheets may be printed or embossed with proprietary labels, the name of the cardholder, a registered number or the like and then laminated with a transparent protective layer of PVC or other similar clear plastics 9 a magnetic strip and a space for a specimen signature, as is usual with such cards.

At least one of the inner surfaces of the sheets 2, 4 may be provided with a recessed area (or areas) 7 slightly larger than the area of sheets 6, so that when the assembly is put together, the two visibly opaque layers 2 and 4 may be intimately joined to each other round their periphery by heat sealing or by adhesive, so as to conceal the fact that the sheet of film 6 is enclosed between them. The sheet 6 may be held securely between the sheets 2 and 4 by friction but is preferably secured by adhesive either in localised spots or evenly spread over the whole of its two surfaces. The latter will produce a stronger structure which will be unlikely to delaminate accidentally. Although sheet 6 has been described as consisting of exposed black and white photographic film it could alternatively be a sheet of transparent plastics film on which the code pattern 8 is printed in ink of a type having good attenuation of transmitted infra-red radiation, or it could be a sheet of opaque material such as metal foil or metal film-coated paper or plastics, on which areas transparent to infrared could be produced by known printing methods such as spark erosion etching or laser beams.

The thickness of the two black plastics layers 2, 4 must be such that the card as a whole is not translucent in normal visible light, and there is no means other than infra-red radiation (or perhaps X-rays or Alpha-rays in the case of a metal-based inner layer) by which the internal coding is detectable.

Figure 2A:
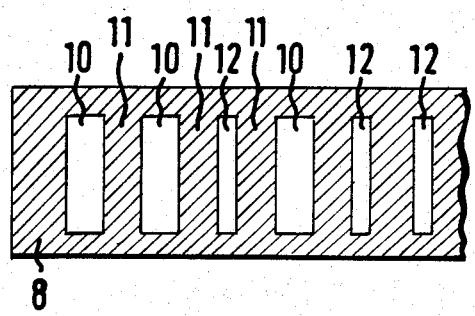
FIG. 2a shows in detail typical dimensions of two types of transparent windows representing the binary digits ONE and ZERO respectively.

FIG. 2a shows an enlarged view of the strip of coded zone 8. It will be seen that the codings take the form of transparent rectangular areas all (typically) 6 mm high perpendicular to the length of the strip 8 but at least two different widths.

Two different window widths 10 and 12 may be used to represent the binary digits ONE and ZERO respectively. Preferably the wider windows 10 will be used to represent ONEs and the narrower windows 12 will be used to represent ZEROs, but the converse arrangement may equally be used. In the embodiment to be described hereafter, it is assumed that the larger windows 10 represent ONEs.

Figure 3A:
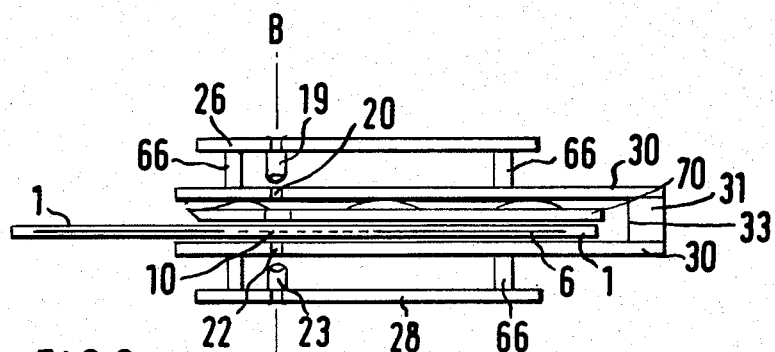
FIGS. 3a and 3b illustrate a typical configuration of a module incorporating the infra-red sensitive components and a card guide, all of which can be mounted with minimal mechanical disturbance in an existing apparatus, and requires only three electrical conductors to connect it into the parent apparatus.
Figure 3B:
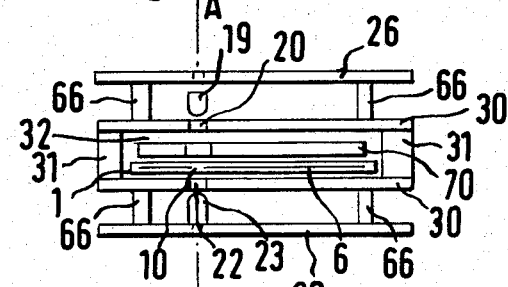

FIG. 3 shows to elevations of a code reader module which may be used to read the codes described above. FIG. 3a shows a cross section on line A—A of FIG. 3b, and FIG. 3b shows a cross-section on line B—B of FIG. 3a.

Two rectangular walls of rigid plastics or metal 30 are joined by spacers 31 along two of their long sides and one short side to form a slot 32 wide enough conveniently to receive the assembled plastic card 1 and long enough to allow it to be inserted for about three-quarters of its length into the slot before coming up against the end wall 33.

About a third of the distance along the slot and offset to one side when viewed from the open end (as in FIG. 3b) apertures 20, 22 are provided in each of the two walls of the slot 32 facing each other and of dimensions corresponding to those of the larger windows 10 in the coded sheet 6. Above one of these apertures is mounted an infra-red light emitting diode or solid state laser 19, while below the other 22 is a phototransistor 23 responsive to infra-red radiation. Between them, they define a beam of infra-red radiation of cross-section nominally equal to the larger size window 10.

While it is desirable that the smaller dimension of the rectangular apertures 20, 22 is not significantly different from the corresponding dimension of wide windows 10, it is advantageous to make the larger dimension of apertures 20, 22 typically 20% larger or smaller than the corresponding dimension of the windows 10, 12. This ensures that the output signals from the phototransistor 23 are not critically dependent on correct lateral positioning of the card 1 in the slot 32.

The card 1 may be pushed by hand into the slot 32 against frictional resistance from the spring-loaded panel 70, the appropriate way round so that the windows 10, 12 of the coded strip 8 pass in succession between the apertures 20 and 22. Until the presentation of the card, there will have been no obstruction in the optical path between the l.e.d. and the phototransistor, but the first significant change to occur when the card is presented will be that the dark leading edge of the code 8 will be detected. The response of the reader to this signal is to increase the current supply to the l.e.d. in order to improve the sensitivity of the reader to the code.

Figure 2B:
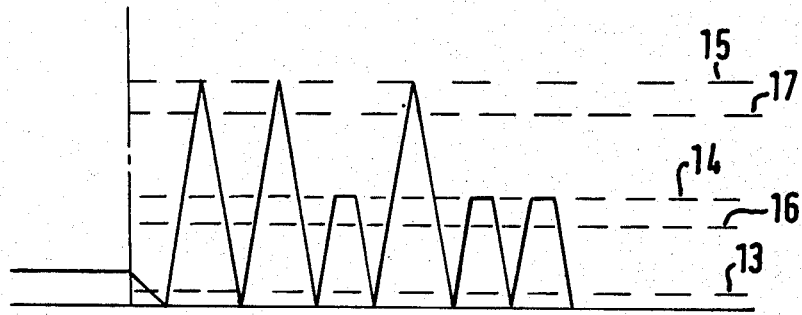
FIG. 2b shows the output current from the single phototransistor when it responds to the passage of two types of transparent window between it and the source of infra-red radiation.

As the first wide window 10 shown at the left-hand side of FIG. 2a begins to allow radiation from the l.e.d. 19 to reach the phototransistor 23, the output signal from the phototransistor begins to depart from a "dark" level 13 shown diagrammatically in FIG. 2b, and rises to a maximum level 15 when the first wide window 10 is aligned optimally with the apertures 20, 22.

As the card is moved further into the slot 32 the signal level from phototransistor 23 falls as the radiation reaching it decreases and returns to below threshold level 13 when the window 10 has completely passed the apertures 20, 22. The spacing between successive windows is such as to ensure that this condition is met after the passage of each window. The same result occurs each time a wide window 10 passes the apertures 20, 22.

When the third window shown in FIG. 2a reaches the apertures 20, 22, this being a narrow one 12 assumed for ease of illustration to be half as wide as a wide window 10, the quantity of radiation reaching the phototransistor is only half as great as that passing a large window 10. Assuming that the phototransistor has a linear response to the quantity of radiation falling on it, its output signal will reach a level 14 nominally half that produced by the wider windows 10. If, in practice, the response of the phototransistor is non-linear at the levels of radiation employed, the ratio of widths between wide and narrow windows 10, 12 may be adjusted accordingly, or it may prove convenient to work with output signals having ratios different from two-to-one. There is clearly scope for adjustment as known to those skilled in the art, to optimise the discrimination between ONEs and ZEROs.

It has been found that the precision of the method is adequate to allow the use of more than two discrete window sizes. Thus it becomes possible to use a ternary code using three sizes of window, a quarternary code using four sizes of window, and even a quinternary or hexal code with five or six sizes of window respectively. The use of such codes in place of binary would enable larger code numbers to be accommodated in a given area, or allow a given range of code numbers to be accommodated in a smaller area, both of which are advantageous features. The use of such codes would also add to the security of the system since they could be more difficult to interpret without the correct reader.

Rather than arranging always to look for the peak signal levels produced when a window passes between the apertures 20, 22, it is more convenient to set threshold levels, such as those represented in FIG. 2b, 16, 17. Whenever the signal exceeds the lowest threshold 16 this is interpreted by the control electronics of the parent system as the arrival of a digit, and may be used to generate a clock signal. Whenever the highest threshold 17 is exceeded, the electronics interprets this as representing the most significant digit value, ONE in the case of a binary system (or ZERO if the inverse significance has been chosen). Similarly, the attainment of other intermediate thresholds may be interpreted as the presence of digits of intermediate significance, when systems other than binary are being used.

The preferred embodiments have the space 11 between windows approximately equal to the width of the wider windows 10.

Figure 4:
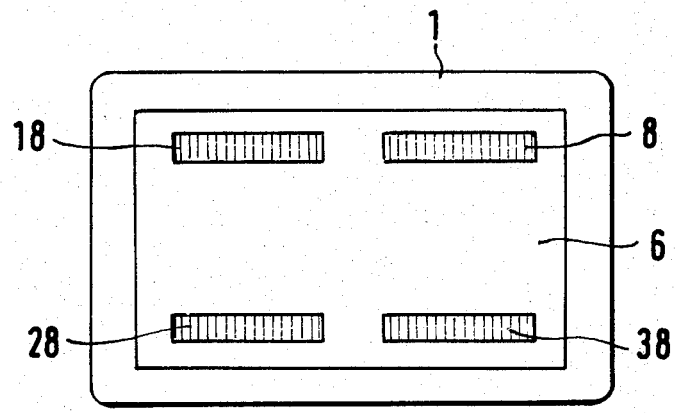
FIG. 4 shows an arrangement in which a card is provided with four different codes any one of which may be presented to the code reader according to which way round the card is presented.

FIG. 4 shows in cross section to reveal the coded sheet 6, a card 1 according to the invention. In this embodiment four separate codes have been provided in four symmetrical positions in the card so that code 8 may be selected if its end of the card is inserted into the reader slot, and with its side under the optical reader components. If it is desired to read code 28 the card would be presented with the other end entering the slot first, and with the same face uppermost. To select code 38 the same end would be presented as for code 8 but the card would be presented upside down. Likewise code 18 could be selected with the card both reversed and upside down. It is thus possible to use one card to input four distinct codes to a reader. This could be useful for example in the case of a time clock when one code could be allocated for clocking-on and a different one for clocking-off. Alternatively the four codes could be used to authorise four different classes of non-standard operations, such as working overtime, arriving late with authority and the like.

It will be obvious to those skilled in the art that less than four codes could be accommodated, and that two codes could be provided for if the optical components were arranged on the centreline of the card slot and the codes 8, 18 were aligned on the centreline of the card.

It could also be arranged that only one of the four codes was a valid one, and this would be read on presenting the card in one of the less obvious orientations, the other three codes being arranged to sound an alarm alerting a supervisor to possible unauthorised use.

Since the code which passes between the optical reader components is arranged to pass completely passed the reading station can be read "on the fly" as each element of the code passes the read station, it can be arranged that the code is read either as the card is inserted into the slot, or it may be read as it is withdrawn. Preferably, the code is read twice, once on insertion and again on withdrawal. If appropriate arrangements are made to load the code into one register when it is read on insertion, and into a second register on withdrawal, the contents of the two registers may be used to verify each other, and the code read is accepted as valid only if the versions held in the two registers agree.

Figure 5:
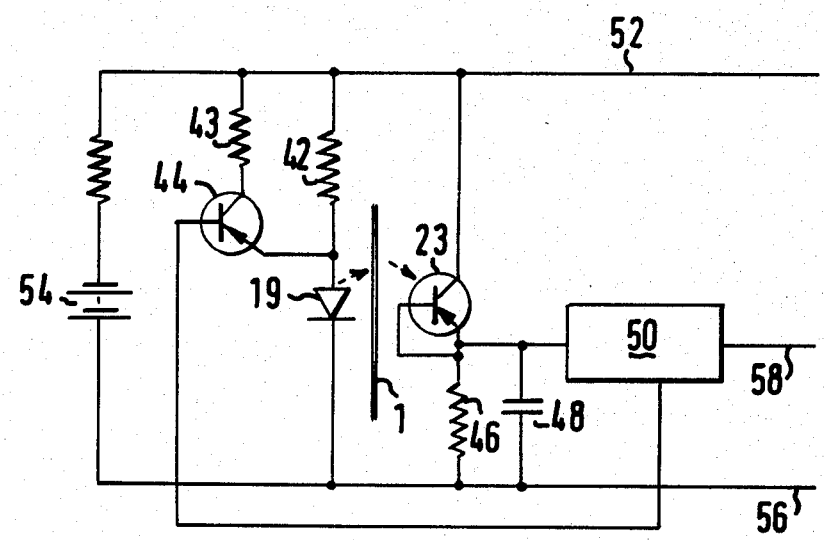
FIG. 5 shows a circuit diagram of an embodiment of the electronics incorporated in the module.

FIG. 5 shows a simple digitial circuit capable of recognising the ONEs and ZEROs and outputting these in computer compatible form to subsequent circuits of any digital system with which the unit may be employed.

In this circuit diagram, the light emitting diode 19 which provides the source of (preferably infra-red) radiation is shown connected through a series resistor 42 typically of 5,000 ohms resistance which allows a dc current of nominally 1 milliamp to flow from a 6 volt supply through the l.e.d. 19 to produce a low intensity level of radiation in order to conserve power. When no card is present between this source and the phototransistor 23, the phototransistor will detect the low level of radiation and output a signal on its emitter which, after processing in the interface unit 50 returns a signal to the transistor 44 to keep it switched off. When a card 1 is inserted between the light source 19 and the phototransistor 23 the change in output is used to cause transistor 44 to switch on and shunt the 5,000 ohm resistor 42 with one of a significantly lower value, such as 270 ohms 43. This causes the current flowing in the l.e.d. 19 to increase the typically 20 milliamps, so illuminating the card with a greatly increased intensity of infra-red radiation. At this higher level of radiation, the phototransistor operates at a higher level of collector current when a better signal to noise ratio and higher frequency response are obtained as the alternate opaque and transparent strips of the code 8 pass between the l.e.d. 19 and the phototransistor 23.

The capacitor 48 connected across the emitter resistor 46 of transistor 23 is provided to smooth out any high frequency extraneous noise which might otherwise impair the clarity of the signal output from the emitter of the phototransistor 23. This output may be processed in one of the several ways, interface unit 50 may therefore take any one of several forms. Three methods are preferred, and the choice of which is used will depend on the details of the application and the characteristics of the the central equipment in conjunction with which the module is to be used.

Interface unit 50 may for example be a voltage to frequency converter of the type in which the input voltage is used to change the capacitance of a voltage-sensitive capacitor. This capacitance, being used as a component in an oscillator circuit would then produce an output 58 of varying frequency dependent on the applied voltage.

Alternatively, interface unit 50 may take the form of a conventional analogue/digital converter, wherein the variable input voltage signal is converted to a serial binary digit stream on output terminal 58.

A third convenient embodiment of the interface unit 50 would involve the use of voltage comparators. The output signal from the phototransistor would in this case, be supplied simultaneously to one input of each of a set of voltage comparators, the other inputs of which would be set permanently at fixed fractions of the maximum voltage produced by the phototransistor when responding to wide code windows 10. When all the comparators detected variable inputs exceeding their fixed reference voltages, or thresholds 16, 17 as defined in FIG. 2b, an output coded to represent binary ONE would be output at 58. When not all the comparators indicated their thresholds to have been exceeded, the appropriate outputs would be provided to represent these lower signal levels.

When using comparators internal to the module, each comparator output could be associated with a digital latch, so that once the threshold had been exceeded the latch would remain set until the signal output fell below a low threshold to represent zero transmission through the coded card, at which level all latches would be reset.

In the preferred embodiment of the design, the first coded window in every code used would be a wide window 10 and the amplitude of the signal output from the phototransistor 23 when this window was scanned would be used as the reference voltage applied to the comparator system used in unit 50. When the output from the phototransistor is converted in unit 50 to a frequency or absolute digital representation of the instantaneous signal levels, the recognition of the maximum amplitude corresponding to the first bit of the code, and the comparison of subsequent amplitudes with the first one may be carried out using a microprocessor resident in the central equipment.

Figure 6:
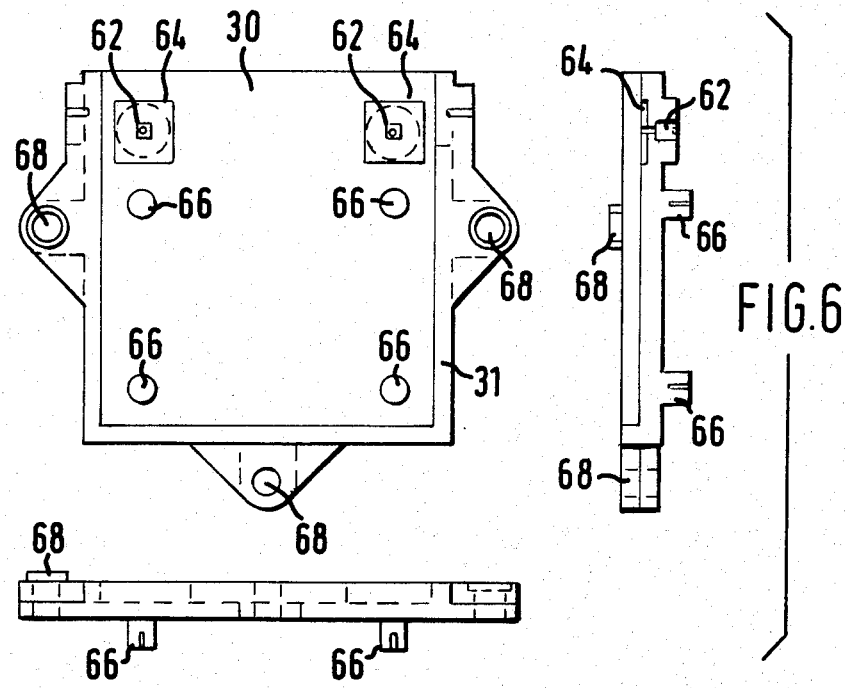
FIG. 6 defines the actual shape of a moulded part two of which joined together form the basic structure illustrated schematically in FIG. 3.

The basic construction of the card slot and its associated assembly has been described with reference to FIG. 3. For manufacture, it is of course preferable to use a low-cost moulded assembly and the proposed shape of one of the two identical halves of such a moulding is illustrated in FIG. 6. It should be noted that the apertures 62 on this figure are designed to hold the l.e.d. 19 and the phototransistor 23 facing each other in the opposing apertures of a pair of mouldings, and that the square recesses 64 are intended to accommodate small inserts of photographic film exposed to define the rectangular apertures designated as 20 and 22 in FIG. 3. The moulded posts 66 are intended to support the printed circuit cards 26, 28 shown in FIG. 3. The three fixing holes 68 are provided for convenient mounting of the module on assemblies in a parent system.

The plastic panel 70 shown within the card slot in FIG. 3 is lightly spring loaded so that it offers a small frictional resistance to the insertion of the card into the slot and also presses the card intimately and repeatably into contact with the lower face of the slot.

Advantages are claimed for the proposed apparatus in comparison with previously known techniques, as follows:
  (i) With only one light emitting diode and one phototransistor, the cost of these and the other associated components is minimised.
  (ii) Since all measurements are made using the same l.e.d. and phototransistor, and since the output signal level is standardised on reading the first bit of each code, no other compensation for the different sensitivities of several optoelectronic components is required.
  (iii) Since the only difference between coded ONEs and ZEROs lies in the different window widths, the tolerances on alignment of the optoelectronic components are not critical, nor is it necessary to use components with narrow beam widths.
  (iv) Because there are definite representations for both binary digits ONE and ZERO, the code provides its own clock signals, and therefore the speeds of insertion and withdrawal are not critical.
  (v) Since the bits are closely packed along the length of the code and the code only occupies one line about 6 mm wide, only a small area of the card needs to be reserved for the code. The rest of the card may be used for eye-readable information. The narrow width accommodated by the code makes it easy to accommodate it between lines of printed text on the card, so making it particularly unobtrusive.
  (vi) The ability to accommodate several codes on one card, which can be read independently using the same reading facilities offers advantages not offered by other designs of similar card.
  (vii) The manner in which the code is wholly accommodated in one line close to the reference edge of the card and the height of the individual code windows is greater than that of the aperture through which the infra-red beam is passed, ensure that the effect of any skew which may occur when a card is presented to a reader is minimised.

The apparatus disclosed may be fitted into the cabinet which houses a time recording or other automatic checking system, or alternatively it may be located remotely from the central apparatus which its signals are transmitted.

When fitted locally, the power supply to the module may be a conventional d.c. supply of typically 5 volts and a local battery 54 as shown in FIG. 5 would not be necessary. When operated remotely, however, it would be advantageous to provide a local rechargeable battery capable of supplying the 20 mA of current to energise the l.e.d. 19 as required for short periods, and which could then be trickle charged at a low current of a few milliamps during quiescent periods over the the power supply conductor 52.

Again, where infrequent usage and long distances from the central equipment made it advantageous, the local battery 54 could be a replaceable one, so making the power supply line 52 unnecessary. The remaining two conductors 56 and 58 providing an earth and signal pair could conveniently be a normal telephone line.

Figure 7A:
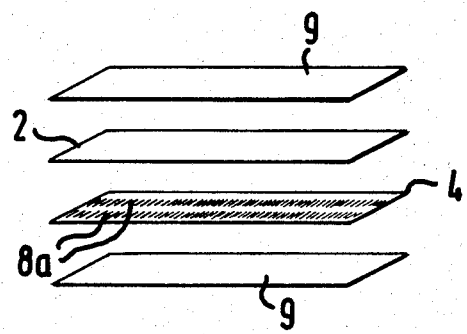
FIGS. 7a, 7b are exploded and diagrammatic plan views of a further embodiment of the plastics card.
Figure 7B:
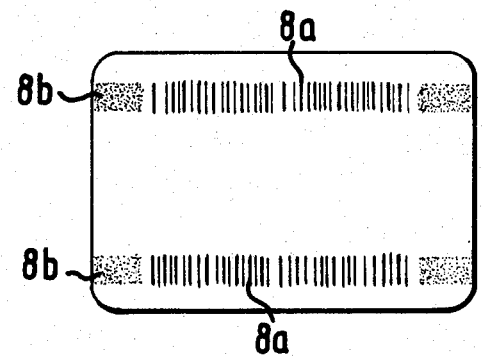

The card of FIGS. 7a, 7b is similar to that of FIG. 1 except that the thin central layer 6 is omitted and instead a pair of lines of code 8a are hot foil stamped onto one of the inner faces of the optically opaque infra-red transparent sheets 2, 4. The stamping die used had easily movable sliders to allow the codes to be changed easily and this provides a rapid and inexpensive way of applying the codes. The card may be formed with all opaque "start up" regions 8b extending right up to its edge that permit the control system associated with the bade reader to detect sooner the presence of a badge.

I claim:
1. The combination of an identification card and reading apparatus for said card, said combination comprising:
  (a) a card provided with a concealed code which, while being invisible to the naked eye when viewed in visible light, is readable in transmission using infra-red radiation, said code being characterized by successive digits represented by transparent windows alternating with regions opaque to infra-red radiation, the said windows and opaque regions being arranged along a line parallel to one edge of the card and each window representing a binary digit of the code with one binary digit being represented by wide rectangular windows while the other binary digit is represented by significantly narrower windows;
  (b) an optoelectric reader consisting of a single source of infra-red radiation and a single infra-red detector arranged to either side of a card slot to enable the coded card to be read on passage along the slot; and (c) an electronic system responsive to a signal from said reader and having a first threshold detector arranged to produce a clock signal each time that the reader detects a window in the card and a second threshold detector arranged to produce a second signal to represent a binary one when a second threshold level of output from the electronic reader is passed, the absence of said second signal when a clock signal is detected indicating the presence of a binary ZERO whereby said code windows are self-clocking and the code can be scanned independently of the rate at which said card is moved along the slot.

2. An instruction or identification card or badge as claimed in claim 1 wherein the card is formed with a sheet opaque to infra-red radiation in which transparent windows represent a binary code, said sheet consisting of exposed and developed photographic film, the transparent areas being areas of film unexposed when the opaque regions were exposed.

3. An instruction or identification card or badge as claimed in claim 2 wherein the transparent windows are produced by chemical or mechanical means in a sheet of exposed photographic film after the whole film has been exposed.

4. An instruction or identification card or badge as claimed in claim 1 wherein the card is formed with a sheet of infra-red transparent plastics material overprinted in an ink opaque to infra-red to produce a pattern of transparent windows in an opaque background.

5. An instruction or identification card or badge as claimed in claim 1 wherein the card is formed with a sheet of metal or metallised film opaque to infra-red radiation in which the required transparent windows are produced by etching, spark erosion or by exposure to a laser beam.

6. A card as claimed in claim 1, in which the sheet opaque to infra-red radiation is smaller in area than the overall area of the card by an amount sufficient to ensure that when the two outer layers of the card are heat sealed or cemented together, the inner sheet is not visible at the edges of the complete assembly; this result optionally being achieved by the provision of a recessed area on the inner faces of one or both of the outer layers.

7. A card as claimed in claim 1, in which the sheet or sheets of material opaque to infra-red are only marginally larger than the area(s) binary coded by transparent windows, the associated electronics being disabled from responding to the general transparent area of the card and enabled to detect the coded windows only on first detecting an opaque margin to the coded area; the coded sheets being located in the complete assembly by recessed areas in the inner faces of one or both of the outer layers.

8. A card as claimed in claim 1, in which the wider transparent windows of the binary code have a width between 1.2 times and 10 times the width of the narrower transparent windows.

9. A card as claimed in claim 8, in which the transparent windows of the binary code are spaced apart by opaque areas at least as wide as the wider transparent windows.

10. A card as claimed in claim 1, in which two coded areas of the partially opaque sheet are arranged to lie on the centreline of the card, and the optical elements of the code reading apparatus are also arranged on the centreline of the card slot, such that one code may be read by inserting one end of the card into the open end of the card slot, and the other code may be read by inserting the other end, inserting the card upside down making no difference to the reading of the respective codes.

11. A card as claimed in claim 1, in which the optical elements of the code reading apparatus are offset from the centreline of the card and one, two, three or four separate coded areas are similarly offset from the centreline of the card so that, depending on the orientation of the card when presented to the card slot, any one of the multiplicity of codes may be read by the code reader at a given time.

12. A card as claimed in claim 1, wherein only one of the multiplicity of codes provided on the card is an acceptable code, the others being such as to produce an alarm signal which indicates that the card has not been used in the designated manner, this designated manner being known only to the bona fide holder of the card.

13. A card as claimed in claim 1, in which the thick plastics layers are of a predominantly black material when viewed in visible light, in order to ensure the concealment of the internal codes, but which material is transparent or translucent to infra-red light to facilitate the reading of the internal codes by infra-red radiation.

14. A card as claimed in claim 1, in which the two thick layers are fused together by a heat sealing process, with the coded sheet sandwiched between them in a positive alignment, such that the presence of a coded sheet is not apparent when the card is examined in visible light.

15. A card as claimed in claim 1, in which the two thick layers are attached to each other and to the inner coded sheet by adhesive so that they appear from the outside to be a single sheet of material, the inner sheet being completely hidden from view in visible light; the adhesive used being itself transparent to infra-red radiation, so that it has no adverse effect on the ability to read the codes.

16. A card as claimed in claim 1, in which the two thick layers are not necessarily opaque to visible light, but sheets of material opaque to visible light are interposed between the coded sheet and the outer layers to render the coded sheet invisible in visible light, the interposed sheets being transparent to infra-red radiation thereby not impairing the reading of the codes in the intended manner by infra-red.

* * * * *